United States Patent [19]
KcKenney et al.

[11] 3,877,289
[45] Apr. 15, 1975

[54] METHOD AND APPARATUS FOR TESTING SHOCK ABSORBERS

[75] Inventors: John D. KcKenney, South Laguna; William H. Conway, Hacienda Heights, both of Calif.

[73] Assignees: John D. McKenney; William H. Conway, ; a part interest to each

[22] Filed: July 9, 1973

[21] Appl. No.: 377,510

[52] U.S. Cl. .................................................. 73/11
[51] Int. Cl. ........................................ G01m 17/04
[58] Field of Search....................... 73/11, 717, 146

[56] References Cited
UNITED STATES PATENTS

| | | | |
|---|---|---|---|
| 3,313,142 | 4/1967 | Lackman | 73/11 |
| 3,642,081 | 2/1972 | Hebert | 177/211 X |
| 3,774,439 | 11/1973 | Emerson | 73/11 |

FOREIGN PATENTS OR APPLICATIONS

| | | | |
|---|---|---|---|
| 228,834 | 8/1963 | Austria | 73/146 |

Primary Examiner—Charles A. Ruehl
Attorney, Agent, or Firm—Fulwider, Patton, Rieber, Lee & Utecht

[57] ABSTRACT

A shock absorber testing apparatus comprising a ramp shaped to excite a particular wheel of the automobile at a frequency bandpass intermediate the fundamental frequency of the automobile spring-mass system and the fundamental frequency of unsprung elements of the suspension, strain gages disposed on the ramp for measuring the wheel loading as the wheel is passed thereover, switch means disposed to be tripped by the automobile wheel as the front wheel leaves the ramp and the rear wheel approaches the ramp for selecting alternate storage circuits receiving the respective strain gage reading associated with each passing of the wheel. In this manner the wheel is excited at a frequency above the response bandpass of the automobile fundamental and the loading measurements are indicative of the shock absorber performance.

9 Claims, 5 Drawing Figures

3,877,289

METHOD AND APPARATUS FOR TESTING SHOCK ABSORBERS

BACKGROUND OF THE INVENTION

1. Field of the Invention

The present invention relates to measurement apparatus, and more particularly to apparatus for measuring the damping performance of shock absorbers mounted directly on a vehicle.

2. Description of the Prior Art

The mechanics of damping of an automobile shock absorber are typically complex being designed to accommodate a wide range of suspension activity and any manual methods of testing of the non-linear behavior thereof is highly subjective and often produces erroneous conclusions. Thus the effectiveness of automobile shock absorbers is typically hart to ascertain either by visual inspection or manual testing and numerous mechanical test procedures have been proposed in the past for measuring the damping performance thereof. Heretofore such testing procedures almost always required the removal of the shock absorber from the vehicle in which it is installed since only in such separated condition could the damping performance of the shock absorbers be accurately measured. Furthermore, the shock absorbers on the vehicle function in close association with various other suspension elements which in themselves are often nonlinear, thus any measurement of the shock absorber performance must necessarily decouple or compensate for the various contributions to the dynamics of motion of the compound spring structure of the suspension. Such shock absorbers are typically included as part of the automotive equipment covered by the general sellers' warranty and since many idiosyncratic opinions are possible as to the quality of the ride at any level of suspension activity a positive method of identifying the functioning of the shock absorber has been quite bothersome in the past. It is also generally recognized that faulty shock absorbers can seriously degrade the handling characteristics of a vehicle and therefore influence the safety of operation. A positive and convenient means for identifying such faulty shock absorbers in vehicle safety inspections is therefore greatly needed at present.

Heretofore most prior art devices would produce a convincing reading of shock absorber effectiveness only after a considerable amount of labor had been expended, i.e. only after the shock absorber had been removed from the car and tested by conventional testing devices. This particular problem has presented significant labor costs in the post-sale services and therefore is a substantial cost item for the automobile manufacturer. Other heretofore proposed apparatus which provides a direct reading of shock absorber quality is typically complex, requiring large amounts of external power to excite the automobile, and is therefore expensive to produce and operate.

SUMMARY OF THE INVENTION

Accordingly, it is the general purpose and object of the present invention to provide a shock absorber testing apparatus which when driven over induces a predetermined transient into the suspension of an automobile and measures the loading response thereto. Other objects of the invention are to provide means for indirectly measuring the response coefficients of an automobile suspension which isolate the damping parameter of the shock absorber from the dynamics of the suspension and which furthermore do so without removal of the shock absorber from the suspension. Further objects of the invention are to provide for measurement apparatus which is generally adaptable to most automobile configurations, i.e. which does not have to be modified to mate with a particular type of suspension or weight of vehicle.

Briefly these and other objects are accomplished within the present invention by providing a ramp structure which is conformed to produce a predetermined excitation of the automobile suspension as the automobile is driven thereover. Specifically it is intended that the ramp be generally sinusoidal in shape, being further compensated in shaping to augment the impulse loss due to the loading deformation of the tire. The shape of the ramp is thus conformed to a geometric configuration which when driven over at a preselected low speed range, such as 8–12 m.p.h. excites the suspension at a particular frequency selected to be above the fundamental mode of the automobile and suspension spring-mass system. The ramp comprises structure which includes a loading and unloading I-beam section extending from either side of a central fulcrum along planes substantially defining sections of a sine wave, said I-beam sections terminating in tangential end sections in a plane above the fulcrum pivot. The deformation of the I-beam sections, as they are loaded by a wheel of an automobile driven thereover, is converted to a change in electrical resistance through conventional strain gages. The strain gages are combined in paired complement for each I-beam section both for the loading and the unloading sides of the ramp and the combined reading thereof is transmitted to a selected integrator for each wheel. The integrators store the integrated loading on both sections of the ramp as a complementary positive and negative reading for the corresponding sections of the ramp. The integrated difference in loading between the sections of the ramp thus provides a reading of damping effectiveness of the shock absorber. The central fulcrum of the ramp provides further isolation between the loading and the unloading sections, extending beyond the plane including the section ends to allow the ramp to rock thereabout. As a result of this loading and unloading of the suspension a reactive loading and unloading of the ramp sections is produced where the front or loading section of the ramp will produce a determinable higher dynamic reading than the rear or unloading section when the shock absorber is operating properly. In this context it is to be noted that the proper operation of a shock absorber is to resist, in a nonlinear manner, the rate of deformation of the suspension elements and therefore increase the force necessary to deform it while resisting the force associated with the return. Since the impulse generated by the ramp shape is of a frequency spectrum much higher than the fundamental frequency of the suspension, the effect is to attenuate strongly the motion of the vehicle body itself. Thus the vehicle body functions as the reference platform against which the suspension is deformed. Included further in the invention is a trip switch which upon passing of the front wheel is switched over from a first to a second integrating circuit to separate the loading associated with each wheel.

DESCRIPTION OF THE SPECIFIC EMBODIMENT

The present invention is directed at apparatus which simultaneously imposes an impulsive load to one wheel of an automobile and measures the reactive loading to the impulse developed by the wheel on the apparatus. The fundamental concept of the invention is to measure the forces on a shaped ramp when driven over at speeds which produce excitation frequencies above the fundamental resonance of the automobile spring-mass system. Thus it is the effective components, i.e., the wheel, relative the frame of the automobile which is registered in terms of loading on the ramp. More specifically, the invention measures the unsprung mass acceleration force, suspension system joint friction effects, the spring force and the shock absorber force. The shape of the ramp, the speed and the dynamic characteristics of the suspension system combine to result in almost equal spring forces on front and rear faces of the ramp. Also at these speeds, the shock absorber retraction and extension rates are high so that damping forces much larger than those generated by joint friction occur.

Figure 1:
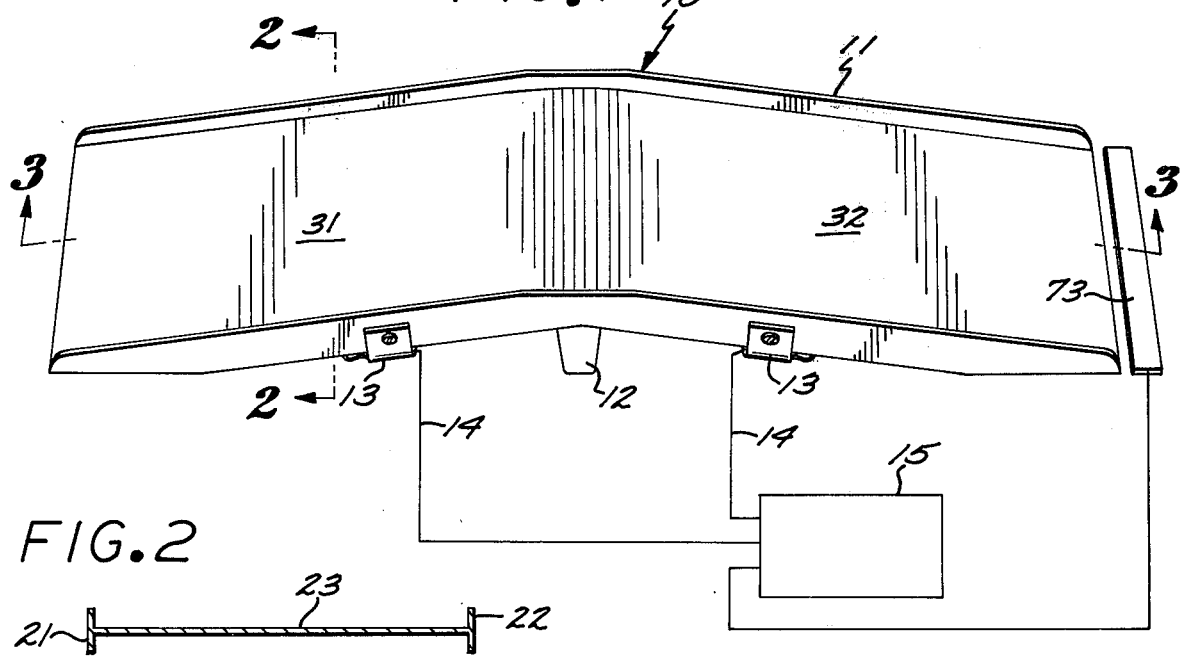
FIG. 1 is a perspective view of a loading ramp constructed according to the present invention.
Figure 2:
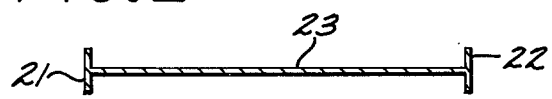
FIG. 2 is a cross sectional view of one section of the loading ramp taken along the line 2—2 of FIG. 1.

As shown in FIG. 1 the present invention generally comprises a ramp assembly 10 including a ramp 11 conformed in longitudinal cross section to substantially define the shape of a sine wave and forming in lateral cross section I-beam sections. The center of ramp 11, corresponding to the maximum amplitude of the sine wave, is supported by a fulcrum 12 which is dimensionally conformed to extend beyond the plane joining the distal ends of the ramp. Disposed on both the front and rear sections of the ramp 11 and substantially central between the fulcrum 12 and the respective free ends thereof are strain gage assemblies 13 connected by leads 14 to an electrical measuring device 15. The longitudinal and vertical dimensions of ramp 11 are dimensionally conformed to provide a predetermined amplitude and frequency of excitation to an automobile wheel 25 as it passes thereover at a preselected velocity. It is contemplated that the automobile wheel 25 progresses onto the ramp 11 while such ramp is aligned in the first stable position supported by the front section free end and fulcrum 12 such that any load registered through the strain gages 13 as result of the deformation of ramp 11 are loads associated with deformation of that section only. This manner of pivoting the ramp 11 about the fulcrum 12 effectively decouples the contribution of the unloaded section of ramp 11 to the loaded section. In lateral cross section ramp 11 forms an I-beam having vertical side flanges 21 and 22 extending longitudinally along the distal edges of horizontal joining web 23. Flanges 21 and 22 provide the mounting structure on which respective ones of the strain gages 13 are disposed in complementary pairs across opposing sections of flanges 21 and 22 to average out any lateral asymmetries in deformation due to off-center loading by wheel 25. The longitudinal cross section of ramp 11 is furthermore compensated for the epicyclic geometry of the wheel 25 as it travels thereover and by a first order linear corrective shaping to account for the deformation of the wheel 25 under nominal loading. These particular geometric corrections and the resulting impulse imposed on the automobile suspension as a result thereof are presented in further detail hereinbelow.

For the purposes of clarity the two stable states of ramp 11 are defined in terms of an on-loading state A and an off-loading state B, where state A supports in beam support the front section of ramp 11 designated 31 while state B forms a beam structure including the rear section designated section 32, sections 31 and 32 forming the respective halves of the ramp 11 joined at the peak with fulcrum 12. The longitudinal geometry of sections 31 and 32 is conformed generally in the shape shown in FIG. 5, defining a substantial sinusoid asymptotic at the free ends with the ground plane when placed in either stable state. The other section is cantilevered from the fulcrum 12. The fulcrum 12 extends below the plane through the extremities of the ramp sufficient to assure rocking motion when supported on a surface having normally encountered irregularities.

Figure 5:
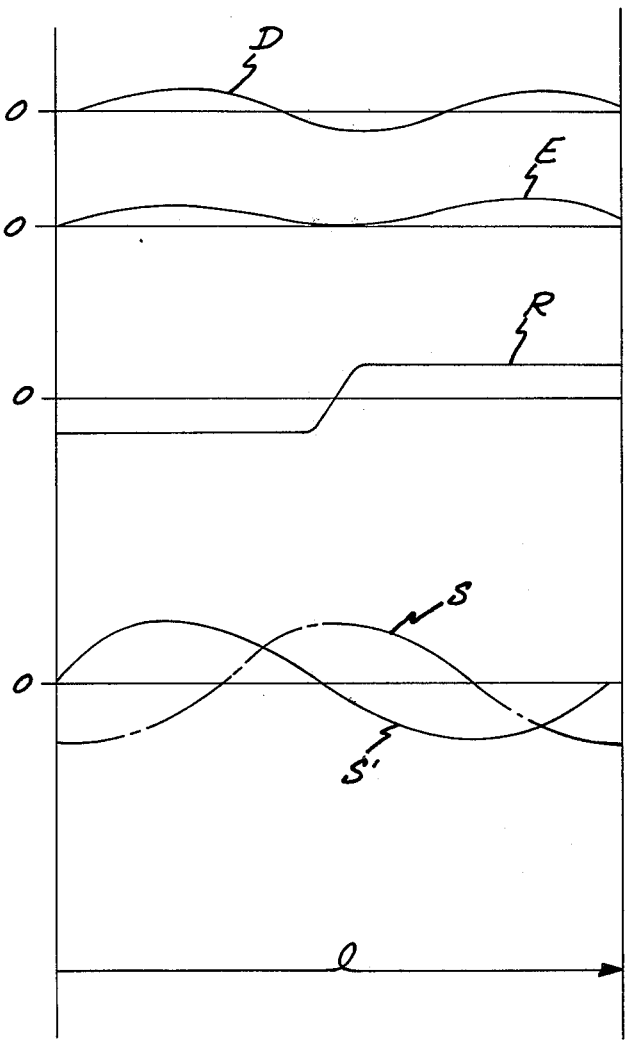
FIG. 5 is a graphical illustration of the selected first order terms superposed to define the longitudinal section of the ramp shown in FIG. 1.

As shown in FIG. 5, the ramp 11 is shaped according to curve D to compensate for the deformation of the tire on wheel 25 in response to the loading. It is to be noted that the empirical characteristics of deformation of a tire with load are substantially constant for all automobile sizes, it being commonly practiced to maintain a substantially constant relationship between the size of the tire, the pressure thereof and the weight of the automobile. These particular relationships are developed for a nominal shock absorber and deviations therefrom will accordingly be deviations from the normal. The correction for the epicyclic effect is further shown as a curve E, and the rocking motion of ramp 11 about fulcrum 12 is expressed as a corrective function R, where curves R, E and D are superposed to provide an impulse function S to the hub of wheel 25. With these first order corrections the shaping of the impulse function S of the ramp 11 reduces to a sinusoidal function at a frequency of impulsive loading which is dependent on the speed of the automobile as follows:

$$f_i = \frac{V}{l} \text{ cycles/sec}$$

where $V$ is the velocity in ft/sec and $l$ is the ramp length. Thus the automobile has to be driven at a predetermined range of velocities in order to maintain the excitation $f_i$ within the frequency domain above 1 cps which typically is in the fundamental body resonance, and below 20 cps which is a typical low limit for the cut-off frequency of the unsprung components of the suspension. Such cut-off frequency, or the fundamental frequency of the suspension elements in the vertical mode can be described essentially as:

$$f_o = 1/2\pi \ (k/m)^{1/2}$$

where $k$ is the spring constant and $m$ is the effective mass. This linear approximation of the spring-mass system defining the vertical fundamental mode of the suspension elements is a quadratic function having a phase relationship determined by the damping coefficient of the shock absorber. Since the physiological limitations of the human neuromuscular system are typically limited to about 1½ cycles per second having a nonlinear fixed time delay of typically .3 seconds, the common practice in the automotive industry is to limit such fundamental mode to the frequency range of approximately one cylce per second. Thus excitation impulses containing dominant frequency spectra in the range of 5 cycles per second should not excite the primary vibrational mode of approximately 1 cycle per second and also be sufficiently below the natural cut-off frequency of the tire-wheel combination.

From the above relationships it should be clear that the limitations on the structure of the ramp 11 must be such that the pivotal impulse of the ramp results in plate modes which are far above any frequencies effecting the loading. Accordingly, it is necessary to form the ramp 11 from structural elements which are both stiff and light in order to maintain the plate modes at sufficiently high frequency separation.

The effective shock absorber activity as result of the impulse produced by ramp 11 is shown as a differential function $S'$ which in linear form reduces to the following expression:

$$S' = \frac{df(S)}{dt}$$

where $$S' = \frac{d \sin 2\pi f_i t}{dt}$$

or $$S' = 2\pi f_i \cos 2\pi f_i t$$

where $f_i$ is the frequency of excitation set forth above and $t$ is a measure of time.

Accordingly the level of excitation of the shock absorber is proportional to the frequency $f_i$ and therefore the velocity of the automobile. It is to be noted that the design performance of a shock absorber is typically nonlinear and therefore any measurements taken must be associated with a selected velocity.

Figure 3:
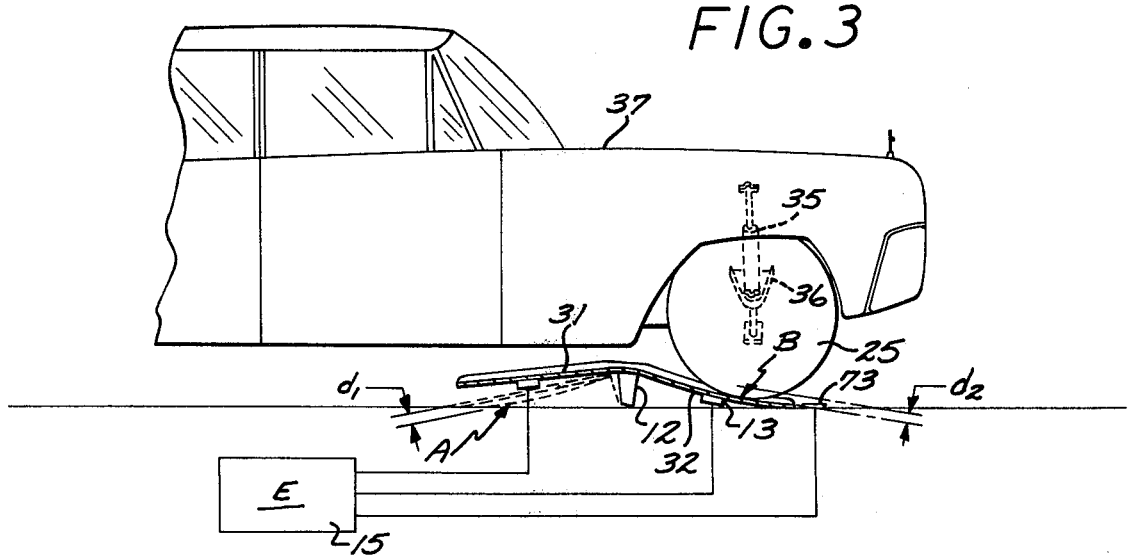
FIG. 3 is a cross sectional view taken along the line 3-3 of the loading ramp shown in FIG. 1 showing the ramp in exaggerated deformation as it is being loaded by an automobile wheel.

The particular deformation due to loading developed of ramp 11 is shown in exaggerated form in FIG. 3. In this illustration reference is made to a shock absorber 35 being tested in combination with typical suspension elements 36 attaching wheel 25 to the frame of automobile 37. The resulting loading on ramp 11 is maximum at the approximate center of section 31 producing a peak deformation $d_1$ thereat. A secondary loading is produced on the rear section 32 resulting in a deformation $d_2$ thereat. These deformations are sensed by the strain gages 13 and collected and integrated with time in the measurement device 15 as described hereinbelow. In order to isolate the contribution of the front and rear wheels a strip switch 73 is disposed on the floor proximate the off-loading end of the ramp to be activated by the front wheel providing the requisite switching between the two integrating circuits within the device 15.

Figure 4:
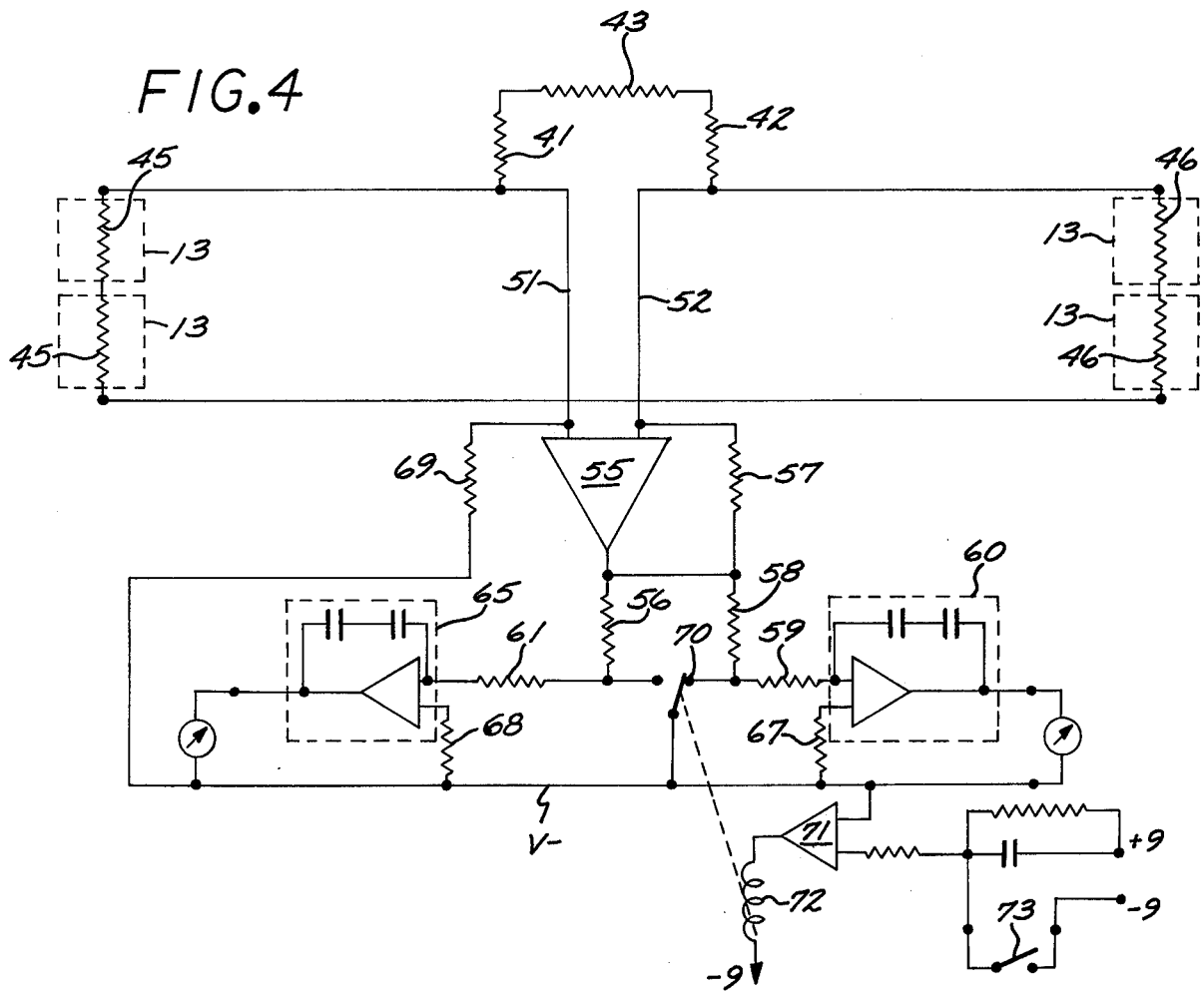
FIG. 4 is a circuit schematic of the electrical measuring equipment of the present invention.

As shown in FIG. 4, the respective strain gages 13 include resistive elements 45 and 46 for the corresponding sections 31 and 32 which in a conventional manner register the deformation history of the corresponding flanges 21 and 22 by a linear change in resistance. Resistive elements 45 and 46 are combined on respective halves of a resistive bridge where the laterally opposing elements of each section are in series effectively summing and therefore averaging the contribution of the respective flanges for the on-loading section 31. Since during all instances the contribution of the strain gages 13 for each ramp section 31 and 32 is essentially decoupled the respective elements 45 and 46 alternatively serve as the reference resistors of a bridge circuit against which a bridge measurement for the other elements is made. More specifically resistive elements 45 and 46 are connected in series to define the two commonly joined resistive legs of the bridge circuit. The other pair of the resistive bridge legs is formed by a three-resistor circuit including resistors 41, 42 and 43. Resistor 42 is generally configured in the form of a variable resistor or potentiometer, smaller in value than resistors 41 and 43, receiving at the wiper thereof a signal v+ which is the D.C. electrical signal exciting the bridge circuit. Resistors 41, 42 and 43 provide both the reference and the adjustment for the bridge null. The bridge balance measurement is taken by two leads 51 and 52 to the input of a conventional differential amplifier or a bridge current amplifier 55. For this purpose an integrated circuit such as the circuit conventionally designated uA 741, being respectively connected at the inverting and non-inverting input thereof to leads 51 and 52, can be utilized. Amplfier 55 at the output thereof provides a signal to resistors 56 and 58 and to a feedback resistor 57 which on the other side thereof sums up with the input lead 52. The common connection of resistors 56, 57 and 58 is furthermore fed by the resistor 58 which is series connected to a second input resistor 59. Resistors 58 and 59 provide a shunt signal switch (with switch 70) to an operational integrator 60, thus decreasing input impedance thereto to minimize drift. At the same time the output of resistor 56 is connected to a series connected input resistor 61 which provides an input to a second operational integrator 65 through the shunt signal switch 70. The other inputs to the operational integrators 60 and 65 are connected to a signal common by corresponding resistors 67 and 68. The signal common furthermore is returned by resistor 69 to the input of amplifier 55 at the input lead 51.

Disposed across the output terminals of resistors 56 and 58 is a two-position switch which at the center terminal thereof connects to the signal common and which is further activated by a relay circuit comprising an amplifier 71 driving a relay winding 72 where the amplifier 71 is tripped or powered by the strip switch 73 which when closed trips switch 70 from a connecting position with resistor 56 to a connecting position with resistor 58. Since switch 70 forms a short either across the inputs to integrator 65 or 60 it essentially forms a hold circuit for the respective integrators when so closed. Switch 73 furthermore is positioned in a conventional manner to be tripped by the front automobile wheel thereby maintaining one integrator in a hold mode while the other integrator is connected to receive the bridge unbalance. In this manner a separate reading can be made both for the front and the rear wheel which provides a measurement of the loading differential across the respective sections of ramp 11 and thereby provides a measurement of the damping characteristic of the corresponding shock absorber.

Some of the many advantages of the present invention should now be readily apparent. The invention provides for a convenient method of testing the damping performance of automobile shock absorbers while such are mounted within the suspension. Furthermore such testing is performed by mostly passive apparatus, utilizing to best advantage the power plant of the automobile. These advantages are achieved at control levels which are easily achieved by any automobile operator.

Obviously, many modifications and variations of the present invention may be made with regard to the foregoing detailed description without departing from the spirit of the invention.

We claim:

1. Apparatus for testing the performance of shock absorbers in combination with a suspension of a vehicle comprising:
   a ramp adapted to support a wheel of the vehicle advanced thereover and responsive in deformation to the loading of the wheel thereon, said ramp being conformed in longitudinal cross section to substantially define a sinusoidal function terminating at either end at the adjacent minimum elevations thereof and including a substantially central maximum elevation:
   a fulcrum attached to the ramp proximate the center thereof and extending normal thereto to a length beyond a plane joining the ends of said ramp; and
   measuring means connected to register the deformation of said ramp for producing a signal indicative of the distributed loading difference thereon in complement about said fulcrum in response to the advancing of the wheel thereover.

2. Apparatus according to claim 1, further comprising:
   switching means connected to said measuring means and adapted to be activated by a selected structure of the vehicle for isolating the signal indicative of the loading on said ramp developed by a front wheel from the signal indicative of the loading developed by a rear wheel.

3. Apparatus according to claim 2 further comprising:
   a first and second integrator alternatively connected with said measuring means according to the position of said switching means, said first and second integrators alternatively integrating in complementary sequence a signal indicative of the loading deformation of said ramp on the distal sides of said fulcrum.

4. Apparatus according to claim 3 wherein said switching means comprises:
   a hold circuit alternatively connected to a respective one of the first or second integrator when the corresponding other one is connected with said measuring means.

5. A method for measuring the damping performance of a shock absorber when connected to the suspension of a vehicle comprising the steps of:
   driving the vehicle to advance selected wheels thereof over a ramp conformed substantially in longitudinal cross section in the shape of a sinusoid, the length of the sinusoid and the velocity of the vehicle while advancing over said ramp being selected to develop a sinusoidal impulse to said wheel of a frequency above the fundamental resonance of said vehicle and below the fundamental resonance of said wheel relative said vehicle;
   measuring the deformation of said ramp on either side of a maximum level thereof in response to the loading imposed thereon by said wheel; and
   combining the deformation measurement of the respective sides of said ramp to produce a measured difference therebetween.

6. A method according to claim 5 wherein:
   the step of combining includes integrating the measurement of the deformation of the respective sides of said ramp to produce an integrated difference therebetween.

7. A method according to claim 6 wherein:
   the step of combining further includes switching between a first integrator and a second integrator for selectively producing integrated differences corresponding to a first wheel of said vehicle and a second wheel thereof.

8. Apparatus for testing the performance of shock absorbers in combination with a suspension of a vehicle, comprising:
   a ramp adapted to support a wheel of the vehicle advanced thereover and responsive in deformation to the loading of the wheel thereon, said ramp being conformed in longitudinal cross section to substantially define a sinusoidal function terminating at either end at the adjacent minimum elevations thereof and including a substantially central maximum elevation and having a first side disposed between one said minimum and said maximum elevation and a second side disposed between the other said minimum and maximum elevation;
   a fulcrum attached at one end thereof to the ramp proximate the center thereof joining said first and second sides and extending substantially normal thereto to terminate for pivotal motion at the other end thereof beyond a plane joining the respective free ends of said first and second sides; and
   measuring means connected to register the deformation of said ramp for producing a signal indicative of the distributed loading difference on said respective first and second sides in complement about said fulcrum in response to the advancing of the wheel thereover.

9. Apparatus according to claim 8 wherein:
   said ramp being further conformed in longitudinal cross section to compensate for pivotal motion about the free end of said fulcrum having said first side shaped to substantially define a half of a sine function referenced to a plane supporting the corresponding one end thereof and the free end of said fulcrum and said second side shaped substantially to define the other half of the sine function referenced to a plane joining the other end thereof and the free end of said fulcrum, said one and the other ends being respectively associated with said first and second sides of said ramp.

* * * * *